United States Patent
Bertele et al.

[15] 3,699,169
[45] Oct. 17, 1972

[54] PROCESS FOR PREPARATION OF TERPENE FLAVORANTS

[72] Inventors: Erhard Bertele, Dübendorf; Peter Schudel, Grüt near Wetzikon, both of Switzerland

[73] Assignee: Givaudan Corporation, Delawanna, N.J.

[22] Filed: Sept. 5, 1968

[21] Appl. No.: 757,772

[30] Foreign Application Priority Data

Sept. 15, 1967   Switzerland.............13041/67

[52] U.S. Cl.................260/604 R, 260/339, 260/413, 260/603 HF, 99/140 R, 260/632 R, 260/601 R, 260/410
[51] Int. Cl..............................................C07c 45/04
[58] Field of Search ...............260/601, 601 R, 604 R

[56] References Cited

OTHER PUBLICATIONS

Bailey, P. S., Chemical Reviews, Vol. 58, 1968, pages 988– 991.

Henne et al., J.A.C.S., Vol. 65, 1943, pages 2183– 2185.

Pinder, A. R., The Chemistry of the Terpenes, 1960, page 115.

*Primary Examiner*—Leon Zitver
*Assistant Examiner*—R. H. Liles
*Attorney*—Cifelli and Behr

[57] ABSTRACT

A process for preparing sinensal by the ozonization of beta farnesene and reduction of the ozonolysis product to obtain sinensal, which is suitable as a flavor-inparting agent of orange aroma.

2 Claims, No Drawings

PROCESS FOR PREPARATION OF TERPENE FLAVORANTS

SUMMARY OF THE INVENTION

This invention provides a commercially-feasible process for making sinensal and compounds related thereto, said compounds being useful as flavorants to impart an orange flavor and aroma to food products such as orange drinks.

Novel intermediates, some of which also possess flavorant properties, are also the subject of this invention.

DETAILED DESCRIPTION OF THE INVENTION

The invention is concerned with a process for the manufacture of compounds of the general formula

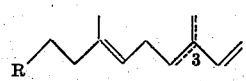  I wherein R signifies a $CH_2OH$, CHO or COOH group, and the broken lines represent a double bond emanating from C-atom 3, and the conversion thereof into α- or β- sinensal of the formula

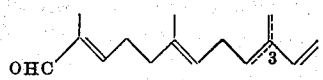  IV

The process in accordance with the invention for the manufacture of compounds of formula I is characterized in that a compound of the formula

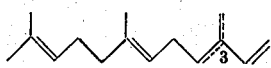  II is ozonized and the ozonization product which is obtained is decomposed to give a compound of general formula I.

α-Farnesene or β-farnesene or a mixture of both can be used as the starting material of formula II.

Formulas I, II and IV are meant to also include the structures which are cis-trans isomeric to the illustrated structures. Thus, for example, formula I is meant to denote both the cis and the trans forms of α- or β- sinensal.

The ozonization of the tetraene II surprisingly proceeds selectively, since the conjugated double bond practically does not enter into reaction with the ozone.

The ozonization can be undertaken according to methods known per se by bringing ozone-containing gas into contact with the tetraene which is to be ozonized, conveniently by introduction of the gas into a preferably dilute solution of the tetraene. Presently preferred solvents are those which are inert to ozone, or at least display greater stability than the substance which is to be ozonized; for example, alkanes such as hexane, petroleum ether, cyclohexane; benzene and its derivatives; halogenated hydrocarbons such as carbon tetrachloride, chloroform, methylene chloride, methyl chloride, ethyl chloride, ethyl bromide; esters such as formic acid or acetic acid esters (ethyl acetate); ketones such as acetone or methyl ethyl ketone; ethers such as dimethyl ether, diethyl ether, tetrahydrofuran; acid anhydrides such as acetic anhydride; acid amides such as formamide, dimethylformamide; nitromethane etc. Among other solvents which may be used are those which can enter into reaction with the ozonide which is primarily formed: carboxylic acids (for example, formic acid, acetic acid, propionic acid); alcohols such as methanol, ethanol, propanol; water in admixture with acetone. Best suited are solvents which are able to hold the ozonization products in solution. Furthermore, low-boiling solvents are to be preferred, since these are usually readily separable from the reaction products. Particularly suitable solvents are, for example: methyl chloride, chloroform, carbon tetrachloride, benzene, acetone, ethyl acetate, methanol.

The concentration of the solution which is to be ozonized can vary within wide limits. In general, dilute solutions give better yields. On practical grounds, 5–20 percent solutions will usually be used.

Conveniently, not more than about 1 mol equivalent of ozone is allowed to act on the tetraene II, in order to avoid an oxidation of the reaction products. Normally, an oxygen stream with an ozone content of about 2–10 percent is used. However, more dilute and more concentrated ozone mixtures also may be employed. If desired, oxygen-free ozone (as the gas or as a solution) may be used.

The ozonization is advantageously carried out at temperatures below room temperature, conveniently at temperatures below 0° C. Particularly good yields are obtained at temperatures within the range of about −50° to 90° C.

The cleavage of the primarily obtained ozonization products to the compounds of general formula I can be undertaken according to methods known per se. Alcohols (formula I; $R=CH_2OH$) may be obtained by treating the ozonization product which is formed with a powerful reducing agent, of the type known to be suitable to reduce ozonides to alcohols, such as a complex metal hydride (e.g. lithium aluminum hydride or sodium borohydride), or with hydrogen, catalytically-activated by noble or transition metals (e.g. palladium, platinum) or complexes of such metals (as for example, tris-triphenyl-phosphine-rhodium chloride).

Aldehydes (formula I: R=CHO) can be obtained from the ozonization products by treatment with a mild reducing agent; of the type known to be suitable to reduce ozonides to aldehydes, for example, an iodide (e.g. sodium or potassium iodide), sulphite, bisulphite (e.g. sodium bisulphite), with formaldehyde, sulphur dioxide, pyridine, hydrazine hydrate, with a sulphide (e.g. dimethyl sulphide), with hydroquinone, zinc or magnesium in acidic solution, with Raney-nickel, phosphorus (III)-compounds (e.g. phosphines such as triphenylphosphine, tri-loweralkyl-phosphites such as trimethylphosphite), hydrogen [catalytically activated by noble-or transition metals or complexes thereof (examples os such systems are $Pt/H_2$, $Pd/C/H_2$.)]

Carboxylic acids (formula I: R=COOH) may be obtained from the primary products of the ozonization by treatment with an oxidizing agent; for example, by treatment with potassium permanganate, hydrogen peroxide, peracids, chromic acid, oxygen (catalyzed by manganese or silver salts). With aluminum hydrides (such as, for example, lithium aluminum hydride), the acids can be reduced directly or, if desired, in the form of their esters to the corresponding alcohols in a manner known per se. Likewise, the acids may be converted via the acid chlorides into the amides (e.g. the corresponding N-methyl anilides or N,N-dimethyl amides) which, as is known, can be transformed into the corresponding aldehydes under the influence of aluminum hydrides (such as, for example, of diisobutyl aluminum hydride or lithium diethoxy aluminum hydride). The esters derived from the acids may also be directly converted into the aldehydes at lower temperature.

The alcohols, aldehydes or carboxylic acids obtained by ozonization of the tetraene II and by subsequent reductive or oxidative cleavage of the ozonization products are new compounds which can be used as intermediate products for the manufacture of compounds having orange aroma, especially of the β-sinensal occurring in orange oil (Citrus sinensis) (trans-β-sinensal: 2,6-dimethyl-10-methylene-2t, 6t, 11-dodecatrienal), of isomers thereof (cis-β-sinensal, cis and trans α-sinensal), as well as of analogues such as, for example, the corresponding alcohols or acid esters which are likewise distinguished by particular aroma notes (flavor after the manner of citrus fruits), on the basis of which the compounds can be used for aromatization, for example, of drinks, in the manner of the well-known flavorant, aldehyde C-10.

Thus, for example, the aldehyde Ia which is obtainable from trans β-farnesene (IIa) can be converted into trans β-sinensal IVa as shown in the following scheme:

SCHEME

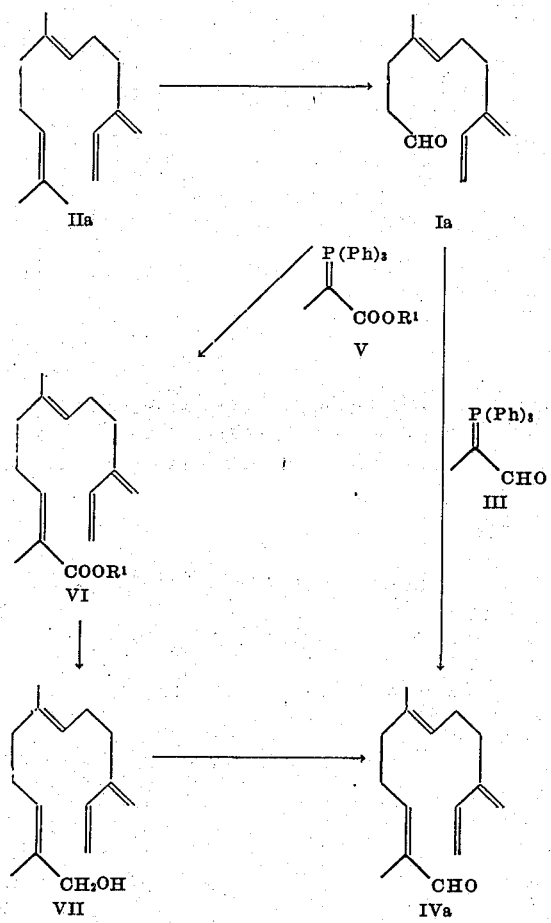

According to the one variant, the aldehyde Ia which is obtained is converted into trans β-sinensal (IVa) according to Wittig with a phosphorane of formula III (wherein Ph signifies a phenyl group).

According to the other variant, the aldehyde Ia which is obtained is reacted according to Wittig with a phosphorane of formula V (wherein Ph has the above significance and $R^1$ represents a lower alkyl group) to give the tetraene ester VI, this ester is reduced to the corresponding tetraene alcohol VII according to methods which are know per se (e.g. with lithium aluminum hydride), and finally the alcohol obtained is oxidized to the corresponding aldehyde (trans-β-sinensal IVa) according to methods which are known per se (e.g. with manganese dioxide).

The manufacture of the phosphoranes III and V, as well as the reactions with the aldehyde Ia, can be effected according to the methods of the Wittig reaction which are known per se (see, for example, Angewandte Chemie 71 (1959), 260). In doing so, one conveniently proceeds in such a way that the aldehyde is added to a freshly prepared solution or suspension of the phosphorane.

In the following Examples, the temperatures are given in degrees Centigrade.

EXAMPLE 1

12.5 g (61.3 mmol) of trans β-farnesene are dissolved in 120 ml of absolute methanol. 49 mmol of ozone are then introduced during 2 hours at −90°. It is then briefly flushed with $N_2$ and the reaction mixture treated at 0° with 6.75 ml (92 mmol) of dimethyl sulphide. After stirring for 1.1/2 hours at 0°, the methanol is distilled off and the residue chromatographed on the 10-fold amount of silica gel (Merck 0.05-0.2). By elution with hexane, there are obtained 6.4 g of starting material (trans β-farnesene). Elution with benzene yields the triene aldehyde (4-methyl-8-methylene-4t, 9-decadienal), which for the purpose of purification is distilled in the bulb tube. (B.p. 90°/0.1 mm; $n_D^{20}$ = 1.4887); IR-bands at 1730s; 1600 m; 900s cm$^{-1}$.

EXAMPLE 2

175 mg (0.98 mmol) of the trans triene aldehyde Ia (4-methyl-8-methylene-4t, 9-decadienal which is obtained and 318 mg (1.0 mmol) of the phosphorane III, (α-formyl-ethylidene)-triphenyl-phosphorane, are dissolved in 5 ml of benzene. The solution is boiled at reflux for 40 hours, the benzene is thereupon sucked off, the residue treated with pentane, the precipitated phosphine oxide filtered off and the pentane again evaporated. The residual oil is distilled. There are thus obtained 161 mg (75 percent) of gas-chromatographically pure trans β-sinensal IVa (2,6-dimethyl-10 - methylene-2t,6t, 11-dodecatrienal) of approximate boiling point 100°/0.1 mm; $n_D^{20}$ = 1.0577; IR-bands at 1700 s, 1600 w, 900 s cm$^{-1}$.

The phosphorane III (melting point 220°–222°) can be obtained as follows: Ethyl iodide is reacted in benzene with triphenyl-phosphine to give ethyl-triphenyl-phosphonium iodide, and this is brought to reaction with butyl-lithium and formic acid methyl ester.

EXAMPLE 3

To a solution of 3.3 g (9.2 mmol) of (α-carbethoxy-ethylidene)-triphenyl-phosphorane in 15 ml of methylenechloride 1.1 g (6.2 mmol) of 4-methyl-8- methylene-4t, 9-decadienal are added at −20° and the mixture is kept for 60 hours at this temperature. The solvent is subsequently sucked off, hexane is added to the residue and the precipitated triphenylphosineoxide is filtered off; the solvent is evaporated from the filtrate and the residue distilled in the bulb tube. There are obtained 1.24 g (78 percent) of a colorless oil, b.p. 100°/0.1 mm. A semple of this oil is chromatographed on a 100 fold amount of silicagel (Merck 0.05–0.2 mm). With benzene the pure 2.6-dimethyl-10 - methylene-2t,6t,11-dodecatrienoic acid ethyl ester is eluted. $n_D^{20}$ = 1.5009. IR bonds at 1725s, 1650w, 1600m, 900s.

100 mg of anhydrous aluminiumchloride (0.75 mmol) and 95 mg (2.35 mmol) of lithiumaluminiumhydride are suspended in 3 ml of absolute ether. 170 mg of 2.6-dimethyl-10-methylene-2t,6t,11-dodecatrienoic acid ethyl ester, dissolved in a small amount of ether are pipetted to the above mixture at −80° under exclusion of humidity. The mixture is stirred for 15 minutes at −30°, then cooled again to −80°, and about 0.5 ml of methanol are added. The mixture is poured on ice/0.1 n hydrochloric acid and then follows extraction with ether. The etherical layer is washed neutral with water and then dried over sodiumsulfate. The ether is distilled off and the residual oil distilled in the bulb tube. 189 mg (83 percent) of 2.6-dimethyl-10-methylene-2t,6t-11-dodecatrienol are obtained, b.p. 100°/0.1 mm. $n_D^{20}$ = 1.5083. IR-bands at 3300s, 1660 w, 1640 vw, 1600s. 900s.

140 mg of $MnO_2$ are suspended in 1 ml of hexane and 40 mg (0.18 mmol) of 2.6-dimethyl-10-methylene-2 t,6t-11-do-decatrienol are added to this mixture. The reaction mixture is stirred for 21 hours at room temperature under nitrogen. The $MnO_2$ is separated by filtration of the reaction mixture through Celite and the hexane is sucked off from the filtrate. The residue is distilled in the bulb tube, thereby 19 mg (48 percent) of trans-β-sinensal are obtained; b.p. 100°/0.1 mm.

EXAMPLE 4

19 mg (0.5 mmol) of sodiumborohydride are dissolved in 1 ml of a mixture of water/methanol= 1:1 and a solution of 168 mg (1 mmol) of 4-methyl-8-methylene-4t,9-decadienal in 1 ml of methanol is added slowly at 0° to the former solution. The reaction mixture is kept for 3.5 hours at room temperature. The reaction mixture is worked up by adding ether to it, then shaking the resulting solution twice with 1 n acetic acid, then washing it with sodiumbicarbonate and finally with water until neutral. The etherical layer is dried over sodium sulfate, the solvent is evaporated and the residue distilled in the bulb tube. 170 mg (100 percent) of 4-methyl-8-methylene-4t-9-decadienol are obtained; b.p. 100°/0.1 mm. IR-bands at 3330s, 1610m, 905s.

The foregoing illustrates the practice of this invention, which however, is not to be limited thereby but is to be construed as broadly as permissible in view of the prior art and limited solely by the appended claims.

What is claimed is:

1. The process which comprises ozonizing a compound having the formula:

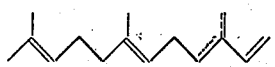

with not more than 1 mole equivalent of ozone per mole of said compound, at temperatures below room temperature and decomposing the ozonization product in the presence of a reducing agent suitable for reducing ozonization products to aldehydes, to form an aldehyde having the formula

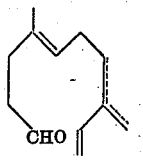

2. The process of claim 1 wherein the starting material is selected from the group consisting of trans α-farnesene, β-farnesene and a mixture of α-farnesene and β-farnesene.

* * * * *